Patented Jan. 8, 1935

1,987,391

UNITED STATES PATENT OFFICE 1,987,391

INSECTICIDE

William McIlvaine Dickson, Woodside, Del., assignor to General Chemical Company, New York, N. Y., a corporation of New York No Drawing. Application May 11, 1931,
Serial No. 536,679

11 Claims. (Cl. 167—14)

The present invention relates to insecticides, and in its more specific aspects is directed to improvements in insecticides adaptable for use as insecticidal sprays or dusts for the treatment of plants generally, fruits in particular, and soils.

Various arsenicals such as Paris green, calcium arsenate, lead arsenate, zinc arsenate and ferric arsenate have been employed or their use suggested for controlling insect pests, either in powder form or in water suspension. Several cyanides, for example the cyanides of copper, zinc, aluminum, barium and sodium, have been proposed for similar use, at least as one or more of the ingredients of insecticides.

The present invention is directed to the provision of an insecticide composition comprising primarily lead arsenate and lead cyanide. The toxic properties of both these compounds have long been known, and lead arsenate has been extensively employed as an insecticide separately and in some instances in combinations with other substances having properties desirable in an insecticide. Although the use of lead arsenate as an insecticide has been familiar practice and the toxic properties of lead cyanide are well known, to my knowledge it has never been discovered that lead cyanide is particularly effective as an insecticide or as an ingredient of such, nor that a composition of matter the major portion of which consists of lead arsenate and lead cyanide in certain proportions possessed effective insecticidal properties decidedly beyond those of prior insecticidal compounds. As far as I am aware, lead cyanide has not heretofore been utilized separately or as a constituent of an insecticidal compound. It was not to be expected that the combination of two compounds, one well known in the art as an insecticide and the other having known toxic properties, would produce an insecticide much more efficient than insecticides heretofore employed commercially or experimentally. Accordingly, the invention is directed to the provision of an insecticidal composition including lead cyanide as an effective ingredient, and preferably lead arsenate and lead cyanide as the principal toxic agents, and employing these as an insecticide comprising these compounds, or having incorporated therewith other suitable substances to adapt the insecticide of the invention to the treatment of some particular fruit, or, for example, to include therein a substance having fungicidal properties.

The proportions of lead arsenate and lead cyanide in the improved insecticide may be varied over a considerable range, although particularly good results have been obtained by the use of certain hereinafter specified quantities. Generally speaking, the insecticide contains a predominating quantity of lead arsenate, in most instances not less than about 65%, an amount somewhat in excess of 80% lead arsenate being preferred, whatever the balance of the composition may be.

One preferred insecticidal composition which has proved efficient in practice, and containing lead arsenate and lead cyanide, consists of these substances in the proportion of about 95% lead arsenate and 5% lead cyanide. In tests carried out in the field for the purpose of comparing the efficiency of this particular composition with other well known insecticides procurable in the market containing lead arsenate as a major constituent, it was found that in the case of apples treated with present known and commercially common insecticides, the percentage of codling moth sting was considerably in excess of 50%, whereas in the case of the above described composition employed under identical conditions, the percentage of sting was reduced to substantially 30%.

There are situations encountered in practice where it is desirable to incorporate into the composition of the present invention other substances to meet some prevailing local condition, or to provide for more successful treatment of certain fruits. For example, for the treatment of apples and peaches, it is often desirable and advantageous to introduce into the present insecticide some such substance as hydrated lime to prevent burning and consequent damage to the foliage. Where hydrated lime was utilized for the purpose, particularly good results were obtained where the insecticide contained about 83% lead arsenate, about 7% lead cyanide, and about 10% of hydrated lime.

In other instances, because of some particular prevailing local condition, it may be desired to include in the insecticide some substance having fungicidal properties, and to this end, a small proportion of Bordeaux mixture has been employed with marked success. One satisfactory composition including this mixture is composed of about 85% lead arsenate, about 5% lead cyanide and about 10% Bordeaux mixture containing about 25% copper. In comparative field tests employing the above compositions having therein hydrated lime and Bordeaux mixture, the codling moth sting on a number of varieties of apples was reduced in the case of the composition including hydrated lime to about 25%, and in the case of the insecticide having therein the Bordeaux mixture to about 30%, as compared with something in excess of 50% in cases where commonly known insecticides were used under the same conditions.

In all of the above compositions, the lead arsenate content should be not less than about 65% and preferably in excess of 80%. The lead cyanide, and the hydrated lime and Bordeaux mixture contents of course vary in accordance with the quantity of lead arsenate employed. In most instances, the proportion of lead cyanide utilized should not preferably fall below about 5% of the total mixture. Likewise, in situations where hydrated lime or Bordeaux mixture is used in conjunction with the lead arsenate and lead cyanide, the amounts of such former substances vary in accordance with the quantities of lead arsenate and lead cyanide. Usually, however, where hydrated lime or Bordeaux mixture is used, the quantity of these substances should preferably be not in excess of about 12-15% of the entire composition.

When the above compositions are to be employed as a spray, satisfactory suspensions may be made up by mixing about one to one and one-half pounds of the insecticide with about 50 gallons of water. Application to the fruit under treatment is effected in the usual manner.

I claim:

1. An insecticide comprising a major portion of lead arsenate and a lesser portion of lead cyanide.

2. An insecticide comprising not less than about 65% lead arsenate, and not less than about 5% lead cyanide.

3. An insecticide comprising in excess of 80% lead arsenate, and not less than about 5% lead cyanide.

4. An insecticide consisting of about 95% lead arsenate, and about 5% lead cyanide.

5. An insecticide comprising a major portion of lead arsenate, a lesser portion of lead cyanide and hydrated lime.

6. An insecticide comprising not less than about 65% lead arsenate, not less than about 5% lead cyanide, and hydrated lime.

7. An insecticide comprising in excess of 80% lead arsenate, not less than about 5% lead cyanide, and hydrated lime.

8. An insecticide consisting of about 83% lead arsenate, about 7% lead cyanide, and about 10% hydrated lime.

9. An insecticide comprising a major portion of lead arsenate, a lesser portion of lead cyanide, and Bordeaux mixture.

10. An insecticide comprising not less than about 65% lead arsenate, about 5% lead cyanide, and Bordeaux mixture.

11. An insecticide consisting of about 85% lead arsenate, about 5% lead cyanide, and about 10% of a Bordeaux mixture containing about 25% copper.

WILLIAM McILVAINE DICKSON.